(12) United States Patent
Caillerie et al.

(10) Patent No.: US 9,019,873 B2
(45) Date of Patent: Apr. 28, 2015

(54) COMMUNICATION METHOD AND APPARATUS

(71) Applicant: Canon Kabushiki Kaisha, Tokyo (JP)

(72) Inventors: Alain Caillerie, Rennes (FR); Yacine El Kolli, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/655,249

(22) Filed: Oct. 18, 2012

(65) Prior Publication Data
US 2013/0100822 A1  Apr. 25, 2013

(30) Foreign Application Priority Data

Oct. 19, 2011 (GB) .................................. 1118042.9

(51) Int. Cl.
*H04B 1/44* (2006.01)
*H04B 7/005* (2006.01)
*H04B 7/14* (2006.01)
*H04B 7/04* (2006.01)
*H04L 1/16* (2006.01)
*H04L 5/16* (2006.01)
*H04L 1/18* (2006.01)

(52) U.S. Cl.
CPC ................ *H04B 7/04* (2013.01); *H04L 1/1671* (2013.01); *H04L 5/16* (2013.01); *H04L 1/1854* (2013.01)

(58) Field of Classification Search
USPC ......... 370/328, 278, 282, 334, 339; 455/13.3, 455/19, 25, 63.4, 82, 562.1, 575.7, 73
See application file for complete search history.

(56) References Cited

U.S. PATENT DOCUMENTS

| 2004/0143676 | A1* | 7/2004 | Baudry et al. ................ 709/237 |
| 2005/0185730 | A1  | 8/2005 | Hansen et al. |
| 2009/0262646 | A1* | 10/2009 | Ramakrishnan et al. ..... 370/237 |
| 2010/0190450 | A1* | 7/2010 | Stirling-Gallacher et al. ......................... 455/67.13 |
| 2011/0158099 | A1* | 6/2011 | Fujita ............................ 370/235 |
| 2011/0261684 | A1* | 10/2011 | Li et al. ......................... 370/225 |

FOREIGN PATENT DOCUMENTS

| EP | 2211483 A1 * | 7/2010 |
| EP | 2253081 A1 | 11/2010 |
| WO | 2004084433 A1 | 9/2004 |

* cited by examiner

Primary Examiner — Benjamin H Elliott, IV
(74) Attorney, Agent, or Firm — Canon USA, Inc., IP Division

(57) ABSTRACT

Methods and apparatus for communicating between a first node and a plurality of second nodes in a network, including a first uplink mode in which a first message is transmitted from multiple second nodes in sequence, and a second uplink mode in which a second message is sent from only a subset of nodes. A first receiving node evaluates communication path information based on messages received in the first uplink mode and returns this information via an acknowledgement to allow the subset to be selected. The first message from multiple nodes includes sequence information to allow the first node to acknowledge at an appropriate point in time. This is particularly applicable where multiple spatially separated antennas offer a receiver several observations of the same signal in an antenna diversity scheme.

20 Claims, 5 Drawing Sheets

COMMUNICATION METHOD AND APPARATUS

CROSS-REFERENCE TO RELATED APPLICATIONS

This application claims the benefit under 35 U.S.C. §119(a)-(d) of United Kingdom Patent Application No. 1118042.9, filed on Oct. 19, 2011 and entitled "Communication method and apparatus". The above cited patent application is incorporated herein by reference in its entirety.

BACKGROUND OF THE INVENTION

The present invention relates to communications protocols, and particularly to communications protocols suitable for a half duplex system involving one-to-many and many-to-one node communication topologies.

The invention relates to data transmission system, typically in a geographically limited framework, also called wireless personal area network (W-PAN). The invention finds particular application at millimeter wave frequencies, typically in the 60 GHz band for communication node interconnection. At such frequencies, electromagnetic signals have a behavior close to that of light, and so preferably require a direct transmission without reflection, ie. Line of Sight (LOS). The spread of these waves is characterized by rapid attenuation of the signal strength. W-PAN in the 60 GHz range is applicable where very high throughputs are required, and where bandwidth is at a premium.

Wireless AN (audio/video) applications are now increasingly numerous and require ever higher data bit rates of the order of some Gigabits per second (here below denoted as Gbps) and an increasingly higher quality of service. W-PAN millimeter type networks are particularly well suited to this type of application. Indeed, the authorized band around a carrier frequency of 60 GHz offers a wide bandwidth thus enabling the transportation of a large quantity of data. Besides, the radio range of such systems is limited to about ten meters, favoring the re-utilization of the frequencies in time and space.

However, the power of the directly transmitted signals is attenuated rapidly as they are propagated. In order to improve signal to noise ratio several methods have been proposed. Antenna diversity uses two or more antennas to improve the quality and reliability of a wireless link. Multiple spatially separated antennas offer a receiver several observations of the same signal. Each antenna will experience a different interference environment, which is to say that each antenna can provide a physically distinct communication channel. Thus, if one antenna is experiencing a deep fade, it is possible that another has a sufficient signal. Collectively such a system can provide a robust link. Such spatial diversity may be observed in receiving systems (diversity reception), as well as transmitting systems (transmit diversity).

Use of multiple antennas to transmit and receive the same information may however increase complexity of communication protocol and compromise bandwidth efficiency to some extent.

SUMMARY OF THE INVENTION

According to a first aspect of the invention there is provided a method of communicating between a first node and a plurality of second nodes in a network, the method comprising, in a first uplink mode, transmitting a first message from all of the plurality of second nodes in sequence, across a corresponding plurality of communication paths, over a first transmission period; receiving at one or more of said second nodes, during a first reception period, a first acknowledgement message from said first node in response to said first message, said first acknowledgement message including communication path evaluation information; and, in a second uplink mode, transmitting a second message from a subset of the plurality of second nodes, said subset selected on the basis of the received path evaluation information, over a second transmission period.

In this way, all communications paths from each second node to the first node are initially used, or attempted, even though only a single path may be required. For example, it might seem more logical for paths to be tried and acknowledged individually until one is successful, meaning that once a successful path is determined, further paths need not be investigated. However, in certain applications it has been found by the present inventors to be beneficial initially to transmit from all paths and subsequently to receive a single acknowledgement.

In a case when all or most of the plurality of paths are valid, time (and consequently bandwidth) may be considered wasted in automatically transmitting the same message from all paths in the first period. However, according to embodiments of the present invention, the acknowledgement can include information on all paths. Since evaluation of all paths is made, a more informed path selection is possible. Where multiple paths are valid or possible, the optimum path from all possible paths can be selected. Alternatively, a combination (eg two or three) of the best performing paths can be selected for transmission during the second period.

Furthermore, since all nodes are used to transmit in the first uplink mode, best possible reception is achieved, and the first message can be a desired, useful message, such as a control command or the like, rather than a test message.

Path evaluation information may be based on Signal to Noise Ratio (SNR) measurements for example. It is noted in this respect that the SNR at the first node of a signal coming from a second node could be unrepresentative of the SNR measured at the second node level of the signal coming from the first node. It is therefore advantageous when assessing or establishing an uplink mode to refer to path evaluation information based on signals in the uplink direction.

Alternative criteria for establishing path evaluation information include reception status (whether or not effective reception is achieved), RSSI level, number of corrected errors by the FEC mechanisms at PHY level, or a combination of such criteria.

Furthermore, even where a path or paths, and corresponding second node(s), are not selected for subsequent transmission, knowledge of communication parameters for such paths can still be maintained to provide future benefit, eg for making an alternative selection in case of failure of the first selected sub-set.

The first transmission period is the time taken for sequential transmission of the first message from each of the plurality of first nodes. In this way, it will be understood that the first transmission period is continuous and includes a time slot for transmission from each of the plurality of second nodes, each transmit time slot directly following the previous time slot.

Transmission from each subsequent first node in this way is performed without acknowledgement of, and irrespective of the success or otherwise of the previous transmission. The first reception period follows the end of the first transmission period, and has a duration determined to correspond to the earliest expected reception of an acknowledgement from the first node to the first message sent in the final time slot of the first transmission period. Such time bounded discovery with a global acknowledgement takes less time than individual acknowledgement after each reception, and is also independent from the second nodes checking sequence order and from the effective path shadowing.

In preferred embodiments the reception period is essentially a passive or listen state during which uplink transmission is prevented owing to the half-duplex nature of the system. Embodiments of the invention aim to minimise the overall amount of time spent in this state while still providing optimum path evaluation and selection. It will be understood therefore that the significance of the reception period in preferred embodiments is to allow sufficient time for the acknowledgement message to be received while providing an upper bound on the passive or listening state following the first transmission(s). In a case where no acknowledgement message is received, for example if all of the transmission paths are invalid, then at the end of the first reception period an error state or cancellation routine can be entered, and the system does not lock or stall.

The first reception period is preferably pre-determined to correspond to receipt at the or each of the second nodes of a first acknowledgement message, having been sent after receipt at the first node of the last of the transmissions of the first period. As noted above however, certain paths may be invalid, and so the final message transmitted during the first transmission period may not be received at the second node. This may be, for example, because of a shadowing effect disrupting line of sight communication. Nevertheless, the first reception period can still be determined to take into account the hypothetical reception of such a transmission.

It is desirable for the first reception period to be made no longer than this determined time period, although a small additional delay period may be added for robustness at the expense of reduced time or bandwidth efficiency.

Commonly aspects of the invention are embodied in a half-duplex system, in which simultaneous transmission from the second nodes is prevented. It is noted however that the acknowledgement message can be simultaneously received by multiple second nodes, but for valid reception only needs to be received by single second node.

The first reception period can be set with respect to the end of the first transmission period, or alternatively the first reception period can be set with respect to the start of the first transmission period, in which case it additionally corresponds to the sum of the time slots for each of the first transmissions. Expected timings can be calculated in advance based on the precise messaging protocol, associated processing times and transmission path delays. A small additional delay may be added as an error margin. In this way, given the number of second nodes, timing of the first reception period can be set on initiation of the first transmission period.

In embodiments, transmissions from each of the plurality of second nodes in the first uplink mode include timing data for controlling the time at which said first acknowledgement message is sent, which timing data varies according to the order of transmission in the sequence. Timing data may be indicative of the number of transmissions remaining in the sequence for example.

This feature allows for variable path validity while still ensuring consistent acknowledgement message timing. Typically the timing data is indicative of the number of expected transmissions remaining in the sequence (ie a decreasing count). It should be noted that this is not equivalent to indicating the number in sequence of each of the first transmissions (an increasing count) in a case where the number of first nodes is unknown to the second node, although this information is typically included also.

Accordingly, in a second aspect the invention provides a method of communicating between a first node and a plurality of second nodes in a network, comprising, in a first uplink mode, receiving at said first node at least one of a sequence of transmissions of a first message sent from each of the plurality of second nodes, over a corresponding plurality of communication paths, said transmission including timing data indicative of the number of transmissions remaining in the sequence; determining, based on received timing data, a time period for the first node to remain in a reception state; and at the end of said time period, transmitting from said first node an acknowledgment message.

Such a method may additionally comprise deriving communication path evaluation information based on received transmissions of said sequence, and including said path evaluation information in said acknowledgement message, as described above for example.

Each of the first transmissions may for example set a timer at the second node. Transmissions may in embodiments set timers which reduce by discrete intervals corresponding to a single transmission time slot. The first transmission will therefore have the longest timer setting, while the final transmission essentially has a zero timer setting. Timer settings from each received first transmission should preferably result in the same or a substantially similar end time.

In this way, the first uplink mode allows subsequent uplink messages to be transmitted via an optimised subset of first nodes, while at the same time ensuring that the first message is reliably transmitted (assuming at least one valid path exists). In certain embodiments, all timings for the first uplink mode can be pre-determined and controlled from the uplink (first node) side, in spite of unknown or varying path validity. Path election can therefore be performed in an optimized time bounded way.

On receipt of the first acknowledgement message, all the effective paths from the second nodes towards the first nodes are established. In addition all paths from the first node towards the second nodes can be evaluated in the case that directionality affects channel or path performance.

The second transmission period is desirably shorter than the first following down selection to the subset of first nodes. The second uplink mode therefore allows more time efficient transmission of messages, thereby increasing capacity across the link. The second transmission period may commence immediately following the first reception period where it is desired to send the second message as soon as possible following the first message, or at any subsequent time when it is desired to send a message in the uplink direction.

According to certain embodiments, a second reception period is defined following the second transmission period. This second reception period allows reception of a second acknowledgement message.

Certain embodiments are configured to return to the first uplink mode at some desired point. This may be following a change in local spatial configuration of the network or following detected degradation of the communication path from said selected subset of first nodes, for example. This allows a path or paths to be re-elected, preferably at a point where it is known or anticipated that a previous election may no longer be optimum. Alternatively the first uplink mode may be re-initiated after a set time period or at predetermined intervals.

A further aspect of the invention provides a wireless communication apparatus having first and second uplink modes, said apparatus comprising means adapted, in a first mode, to transmit a first message sequentially from each of a plurality of spatially separated communication nodes offering a corresponding plurality of communication paths; means to receive, at one or more of said nodes, a first acknowledgement message in response to said first message, said first acknowledgement message including communication path evaluation information; and means adapted, in a second mode, to transmit a second message from a subset of the plurality of nodes, said subset selected on the basis of the received path evaluation information.

A yet further aspect of the present invention provides a wireless communication apparatus comprising means for receiving at least one of a sequence of transmissions of a first message sent over a corresponding plurality of different communication paths, said transmission including timing data indicative of the number of transmissions remaining in the sequence; means for determining, based on received timing data, a first time period for remaining in a reception state; and means for transmitting, at the end of said first time period, an acknowledgment message.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa. Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings in which.

DETAILED DESCRIPTION OF THE PREFERRED EMBODIMENTS

Figure 1:
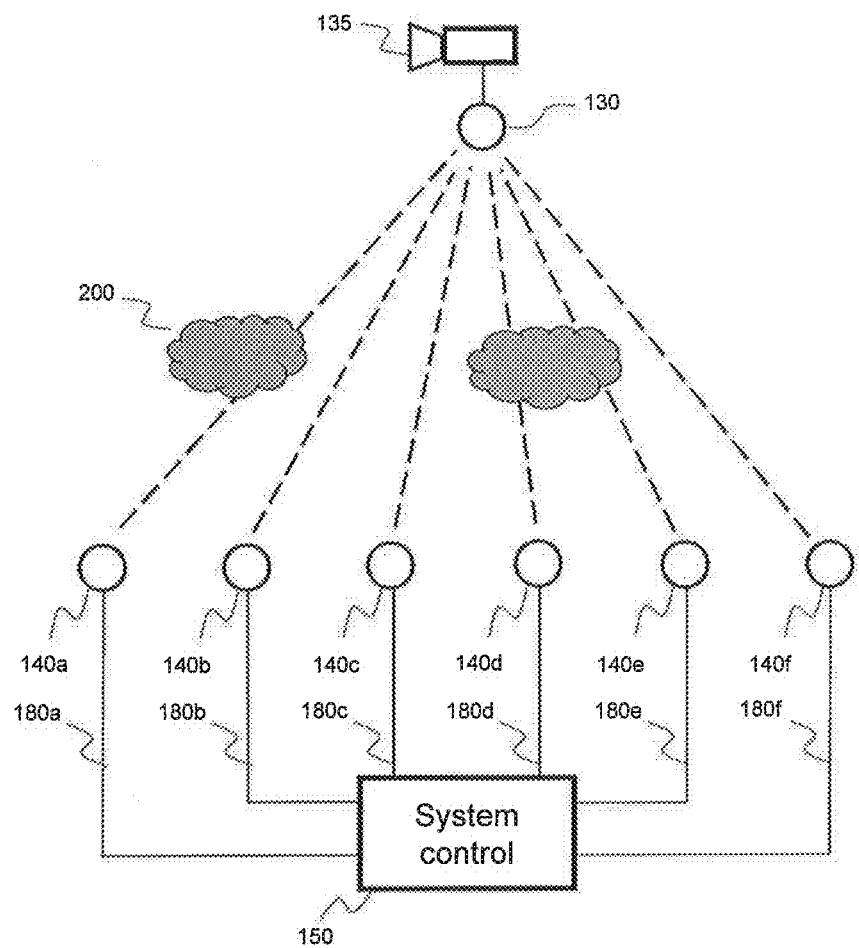
FIG. 1 is a simplified schematic view of a one-to many communication topology.

Referring to FIG. 1, a system controller 150 is connected with a plurality of second nodes 140a, 140b, 140c, 140d, 140e, 140f, typically in a wired arrangement as illustrated by solid lines 180a, 180b, 180c, 180d, 180e, 180f respectively. The second nodes are typically arranged at separate locations spaced apart from one another so as to provide spatial diversity in a wireless personal area network. Each of the first and second nodes includes an antenna or antenna array to facilitate wireless communication between the first node 130 and the second nodes 140a-f via a plurality of communication paths indicated by dashed lines. Six second nodes are included in the present example, but any number greater than one is theoretically possible.

In this example, this configuration is used to provide an asymmetric communication system with downstream data (from node 130 to system controller 150 being communicated over a one to many node wireless topology and upstream data (from system controller 150 to node 130) via a many to one node wireless topology. Typically downstream communication may have a data rate and volume significantly higher than upstream communication, averaged over time.

Embodiments of the invention concern systems where the first node is moveable, while the second nodes are fixed. A typical example is a robot arm, equipped with an image capture device including a first node, operating within a fixed physical framework, eg a plant base or support structure. After each capture, the image from this moving first node is then wirelessly transmitted to a system control when the robot arm is in a stable position. Subsequently, the robot arm could move to a new position for another image capture. Several fixed second nodes are distributed about the first node to allow wireless image transmission, because movement of the robot arm, or other objects within the local environment could cut or inhibit path propagation in cases where direct or line of sight transmission is required. After each change of configuration of the local environment (eg movement of the robot arm) the effectiveness of the paths between the first node 130 and each of the second nodes 140a, 140b, 140c, 140d, 140e, 140f is unknown For example, at a given instant, obstacle 200 is shown preventing line of sight radio communication between nodes 130 and 140a.

For communication from the system control to the first node via the second nodes, the second nodes cannot transmit wirelessly simultaneously, due to interference effects for example.

It is therefore desirable, after each change in spatial configuration (each new position of the first node 130) to send the first transmission command from the system control 150 successively through each second node 140a, 140b, 140c, 140d, 140e, 140f (ie in the first uplink mode) in order to be sure the command can reach the first node through the best possible path (by using every possible path). On receiving, the first node 130 gathers information about the signal quality received from the various second nodes. The first node prepares a single global ACK message with an information field including for each second node 140a, 140b, 140c, 140d, 140e and 140f some received signal quality indicators. These indicators associated to each second nodes include any information which could be helpful to determine the best path: effective reception or not, RSSI level, number of corrected errors by the FEC mechanisms at PHY level, SNR, or other suitable information. It is noted that the ACK message may also contain useful data other than the received quality indicators, such as a contextual response to the first transmission command.

For the transmission from the first node to the second nodes, all the second nodes which are not shadowed by obstacles can simultaneously receive Line Of Sight from the first node.

The present invention is particularly applicable to the communication of image/video and/or audio data. In one embodiment the first node is, or is integrated with an image capture device. In this embodiment downlink data typically comprises video and optionally audio data. Uplink data may comprise control messages or commands to control the image capture device (eg start/stop video capture, turn on/turn off, illumination) or data for configuring the antenna or antenna array of the first node for example.

These commands are used to control the camera associated to the first node located at the end of the robot arm, but could be also used for an ARQ protocol requesting the retransmission of erroneous image data.

Figure 2:
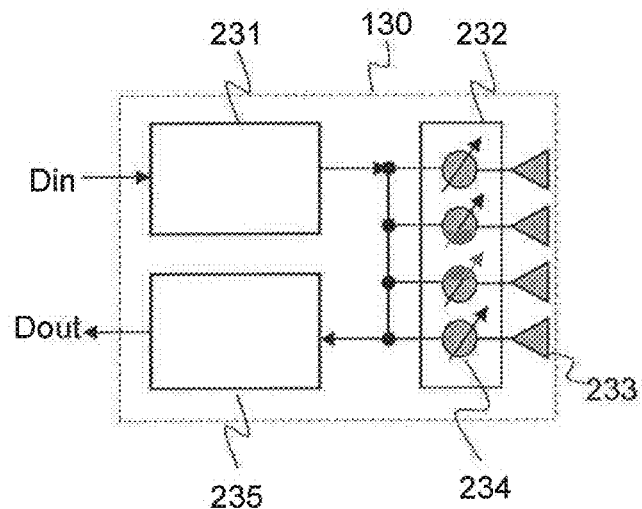
FIG. 2 shows the functionality of an example communication node.

As shown in FIG. 2, each node typically comprises a transmit module 231 adapted to receive data to be transmitted, and convert the data into a signal to drive the antenna array 232, in accordance with a desired transmission protocol. The transmit module may perform framing, encoding, digital modulation, digital to analog conversion and frequency transposition for example. Antenna array 232 includes several elementary antennas or antenna elements 233, however it will be understood that the invention is equally applicable in the case that one or more nodes employs a single element antenna (eg a horn antenna). Each antenna element 233 may be fed by a signal adjusted in phase and amplitude, the adjustment of the signal being symbolized by the variable element 234. The nodes also typically include a receive module 235 adapted to process signals received by the antenna array and to output data in the appropriate format. The nodes are capable of a beam steered configuration and also have the capability of operating in an omni-directional mode.

Figure 3:
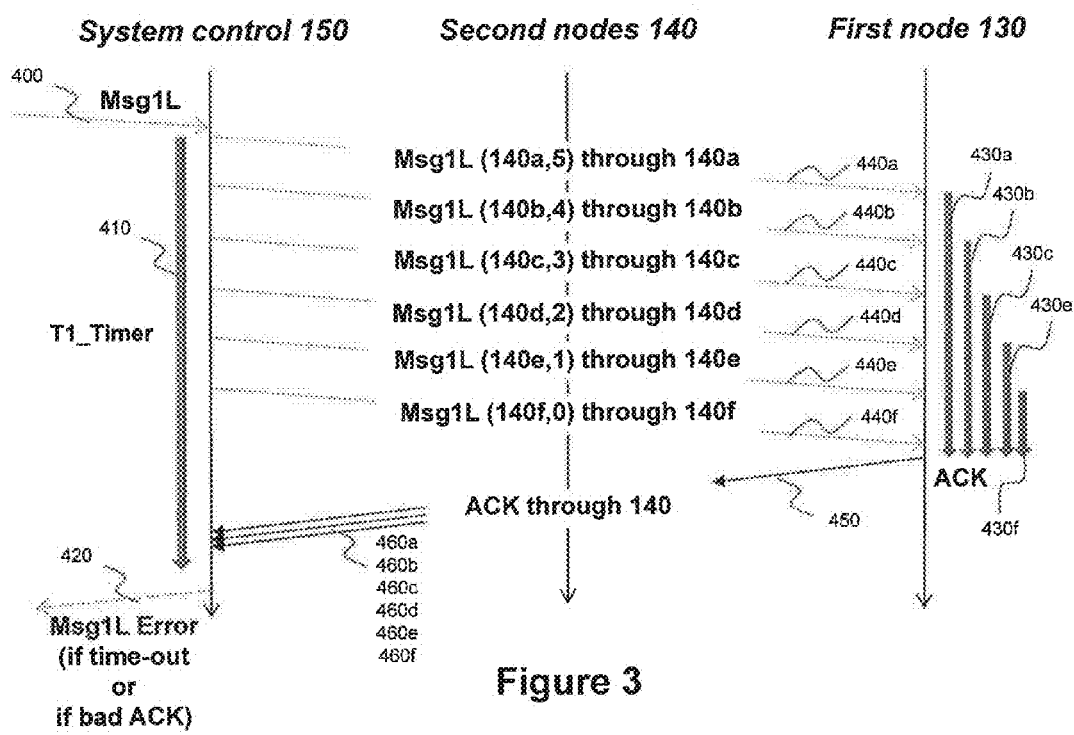
FIG. 3 illustrates a time bounded sequence applied to long transaction messages.

The first uplink mode is illustrated schematically in FIG. 3, in which time is shown advancing down the page. A timer T1 (410) is started as a long-format (first uplink mode), first transaction message 400 issued from the system control 150 to be sent to the first node 130 is provided to a second node 140a. This timer 410 corresponds substantially to the total duration of the successive message transmissions through all the second nodes 140a, 140b, 140c, 140d, 140e, 140f, and to the duration of receiving an ACK from the first node 130.

The message through the second node 140a includes the identifier of the second node 140a and the number of remaining transmissions remaining via the other second nodes (in the current example with 6 second nodes, the remaining transmissions of the message is 5), this message being forwarded through wireless (440a) by the second node 140a towards the first node 130. Upon reception of the message, the first node starts the T2 timer with a value (430a) corresponding to the necessary time for the 5 remaining messages to be potentially received before sending the global ACK. When receiving the message, the first node 130 performs also path quality estimation with the second node 140a thanks to local information such as the number of error corrections performed, SNR, etc.

Similar operations are then performed via the second nodes 140b, 140c, 140d, 140e, 140f using appropriately updated second node identifiers (respectively 140b, 140c, 140d, 140e, 140f) and the number of remaining transmissions to be performed (in the current example with 6 second nodes, the remaining transmissions number of the message is respectively 4, 3, 2, 1, 0), the same message (which may for example be a camera control message) is forwarded wirelessly (respectively 440b, 440c, 440d, 440e, 440f) by the second node (respectively 140b, 140c, 140d, 140e, 140f) towards the first node 130. Upon reception of the message, the first node 130 initializes the T2 timer with a value (respectively 430b, 430c, 430d, 430e, 430f) corresponding to the necessary time for the respectively 4, 3, 2, 1, 0 remaining messages to be potentially received before sending the global ACK. While receiving successively the message, the first node 130 also performs the path quality estimation associated to each second node (respectively 140b, 140c, 140d, 140e, 140f).

It has to be noticed that in an alternative embodiment of the invention, the timer T2 is not reinitialized with a new value each time the message is received from one of the second nodes but the timer T2 is only initialized at the first valid reception from any one of the second nodes 140a, 140b, 140c, 140d, 140e, 140f.

Another alternative embodiment of the invention consists in not indicating in the message the number of remaining transmissions to be done, but instead to indicate directly the settings value for the timer T2. In such case the T2 timer value is computed in the source side (system control 150) instead of the destination side (first node 130).

At the end of the timer T2, the first node 130 no longer expects to receive any additional copy of the message belonging to the current long-format transaction, so all the paths quality estimations are gathered and wirelessly forwarded to the system control 150 through all the second nodes in an ACK message 450. Each and any second node 140a, 140b, 140c, 140d, 140e, 140f receiving the ACK message 450 performs a retransmission (respectively 460a, 460b, 460c, 460d, 460e, 460f) of the ACK to the system control 150.

If at the end of the timer T1 (410) the system control 150 has not yet received the global ACK from the first node 130, or if it received a negative ACK (no valid paths), it determines that communication between the system control 150 and the first node 130 through any of the all the second nodes (140a, 140b, 140c, 140d, 140e, 140f) is not possible, so the system control 150 informs the upper layers by an error message 420. In the case of a positive ACK received by the system control 150 corresponding to an acknowledgement of the long message transaction, the system control 150 can elect a second node to be used for short-format (second uplink mode) transaction messages. This election is based on the paths quality estimation included in the ACK provided by the first node 130. In an alternative implementation, the system control 150 could decide to elect a subset of second nodes, instead of a single second node; this could be useful to improve the transmission reliability in case the best path quality estimated is not enough to guaranty a correct wireless transmission from the system control 150 towards the first node 130.

In an alternative embodiment, the second node to be used for short transaction messages could be elected by the first node 130 instead of election done by the system control 150 because the first node 130 has the quality indicators concerning all the transmissions from each second node. In such case the global ACK will directly indicate the reference of the elected second node 140 (or of the subset of elected second nodes).

It is noted that the T2 timer management allows a time bounded process for the path quality estimation of all of each path and the global ACK generation, this method is less time consuming (less than 50%) than successive individual ACK after each path transmission. It is also globally less time consuming (by approximately 50%) to have a timer T2 initialized on the expected number of remaining receptions, than having a timer triggered with a fixed value which is not optimized (this effect is apparent if only the last checked path is the good one).

The method has also the advantage to elect the second node or nodes (140a, 140b, 140c, 140d, 140e or 140f) for wireless transmission towards the first node 130, based on real quality propagation measurement performed in the same conditions (in an uplink direction towards the first node 130), this is more representative than for example performing the measurements in the reverse direction (from the first node 130 towards each second node 140a, 140b, 140c, 140d, 140e or 140f).

Figure 4:
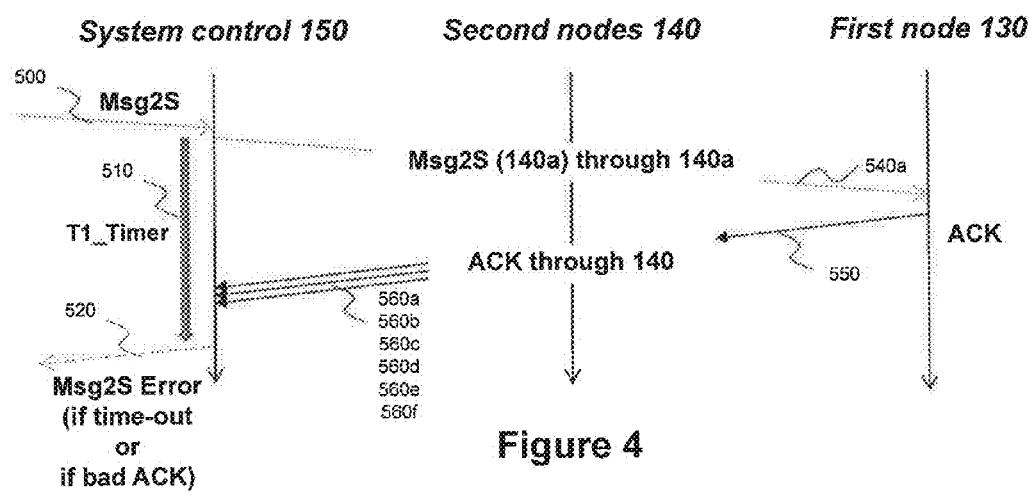
FIG. 4 illustrates the sequence applied to short transaction messages.

FIG. 4 illustrates a mechanism for short-format (second uplink mode) transaction messages. Such mechanism is applied when a second node 140 (or a subset of second nodes)

has been elected for the communication from the system control 150 towards the first node 130. FIG. 4 depicts an example where the second node 140a has been elected as the only single relay node to be used to transmit wirelessly towards the first node 130.

At the same time the short-format transaction message 500 from the system control 150 to be sent to the first node 130 is provided to the second node 140a, a timer T1 (510) is started. This timer 510 corresponds substantially to the total duration of the message transmission through the second node 140a and to the duration of receiving a response from the first node 130.

The message through the second node 140a is forwarded through wireless (540a) by the second node 140a towards the first node 130. Upon reception of the message, the first node 130 immediately replies to the system control 150 through all the second nodes (simultaneous reception) with an ACK message 550. Each second node 140a, 140b, 140c, 140d, 140e, 140f receiving the ACK message 550 performs a retransmission (respectively 560a, 560b, 560c, 560d, 560e, 560f) of the ACK to the system control 150.

If at the end of the timer T1 (510) the system control 150 has not yet received the ACK from the first node 130, or if it received a negative ACK, it informs the upper layers using an error message 520. In the case of good reception by the system control 150 of the ACK corresponding to an acknowledgement of the short message transaction, the system control 150 can transmit similarly any potential new transaction message.

Short-format transaction messages could be used for command and control of the first node 130 or for its associated camera 135. Short transaction messages could be also advantageously used for an ARQ protocol during the image transfer phase. In such case the wireless operations are mainly dedicated to image transmission from the first node 130 towards the system control 150 through the second nodes 140a, 140b, 140c, 140d, 140e, 140f. In order to be able to request retransmission of poorly received sub-parts of image for example, the system control may need to request retransmissions, or to confirm good data receptions. Such ARQ protocol should desirably have limited bandwidth impact, and short transaction messages are very suitable for this operation, as they use only the best available path or paths.

Figure 5:
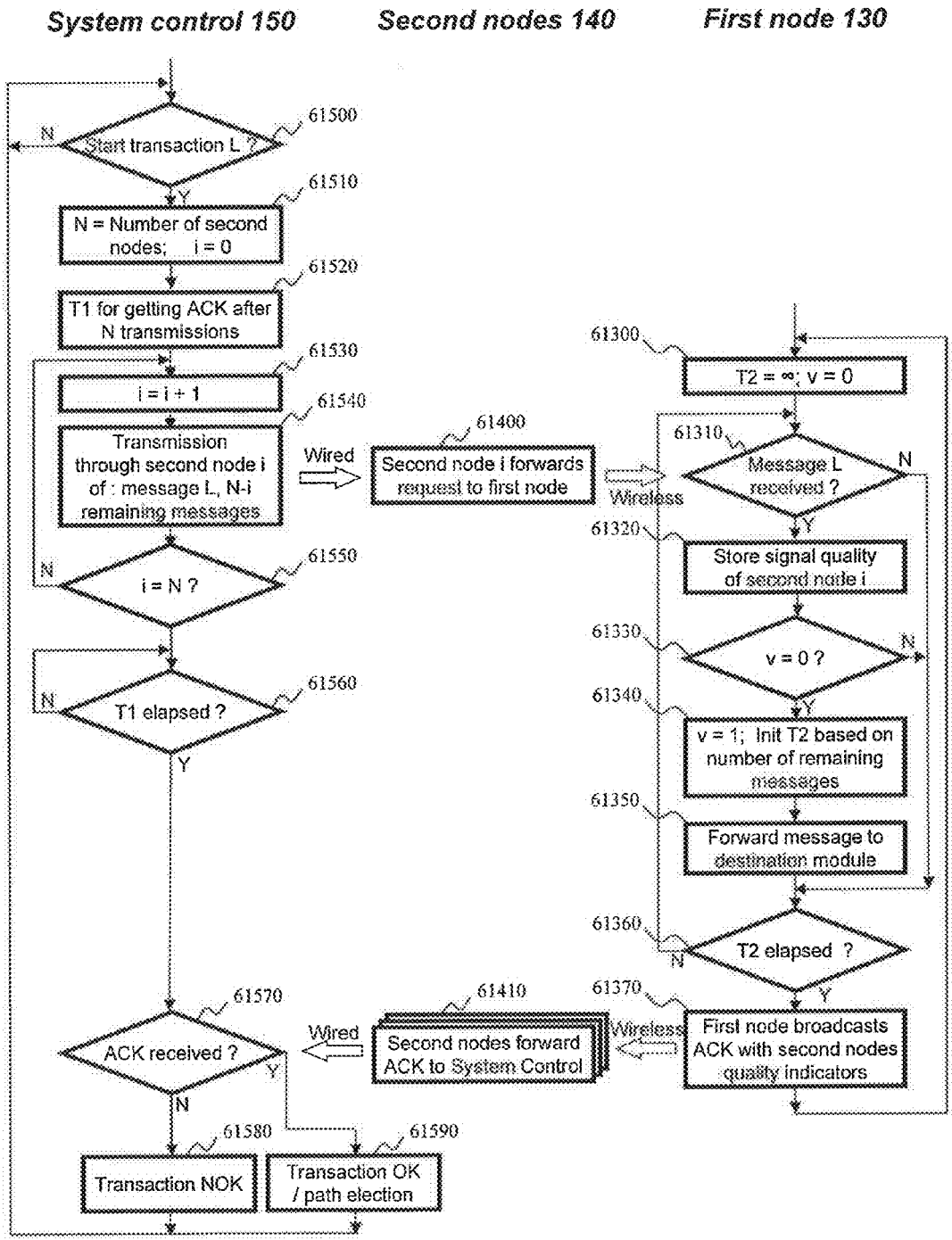
FIG. 5 is a flowchart of a method for optimizing bandwidth usage according to a particular embodiment of the invention.

FIG. 5 depicts a flowchart of the method for determining the best paths, and for optimizing the bandwidth usage, using the time bounded long-format transaction message operations. This process is implemented when the communication status between each second node and the first node is unknown, for example at the beginning of a new robot cycle. The flowchart is organized in 3 main columns: the left column concerns the operations performed by the system control 150, the right column concerns the operations concerning the first node 130, while the central column concerns the activities of the second nodes 140a, 140b, 140c, 140d, 140e, 140f.

In the system control side 150, the step 61500 represents waiting for a request of long transaction message. As soon as such transaction request is detected, during the step 61510 the system control initializes the variable N with the total number of available second nodes and the variable i to zero.

Then, during the step 61520, the timer T1 is initialized with a timeout duration limited to the whole transfer of N successive transmissions through the second nodes 140a, 140b, 140c, 140d, 140e, 140f to the first node 130, and to the reception from the first node 130 of the global ACK including path quality estimations of signal reception at the first node 130 from all the second nodes 140a, 140b, 140c, 140d, 140e, 140f.

At the step 61530, the variable i is incremented by 1. Then in 61540 the system control 150 sends the pending message to the second node 140 indexed i while indicating in the message there is N−i remaining copies of the message to be transmitted. The step 61550 is a loop causing a copy of the message to be retransmitted:
the successive transmissions of the message through all the second nodes 140 are completed if i=N, so the process goes forward in 61560;
the successive transmissions of the messages are not yet finished, then by going to step 61530 the system control 150 can send a copy of the message through another second node 140.

During the stage 61560, the system control 150 is waiting for the end of the timer T1. In case the timer is elapsed, the following step 61570 is checking if a global ACK has been received. A negative answer means at the step 61580 the transaction is invalid, so this information has to be provided to the upper layers of the system control 150, and a jump to 61500 allows the system control 150 to be ready for waiting for a new long transaction message transmission.

In case the step 61570 detects a positive global ACK, the long transaction message is considered to have been successfully transmitted to the first node 130, and based on the paths quality estimations embedded in the ACK, the system control 150 can elect one of the second node 140 (or a subset of second nodes if necessary) allowing to use short transactions for the following messages to be sent from the system control 150 to the first node 130 during the rest of the current robot cycle.

In the first node side 130, the step 61300 is used for initializations: the timer T2 is set inactive and the flag v is set at zero. Then in step 61310, the first node 130 is waiting for a correct reception of a long transaction message. As soon as such message is received, in the step 61320 the corresponding quality indicators are stored for the wireless signal issued from the second node i whose address is included in the message.

Then in 61330, it is checked if the current received message is the first of the current long transaction. In negative case, the status of the timer T2 will be checked at 61360; but in positive case (step 61340) the flag is set to 1 and the timer T2 is initialized at a value corresponding to the necessary time to receive all the remaining messages of the current long transaction, this number of remaining messages is indicated in the content of the received message. Then, in 61350, the received message is forwarded to the dedicated module of the first node 130.

At the step 61360, the first node 130 verifies if the timer T2 is elapsed. If the timer is still valid, some copies of the message could be potentially received from other second nodes at the step 61310. Else the reception of the current long transaction is completed and the global ACK has to be prepared with the reception quality indicators for each second node 140. The first node 130 wirelessly broadcasts (only one transmission) the global ACK 450 to all the second nodes 140 at the step 61370.

As seen, at the step 61540 the system control 150 sends the message to the second node 140 indexed i, and at the stage 61400 the concerned second node 140i wirelessly forwards the message to the first node 130.

For transmission in the reverse direction, at the step 61410, any second node 140a, 140b, 140c, 140d, 140e, 140f receiving the global ACK 450 from the first node 130 forwards it to the system control 150.

Figure 6:
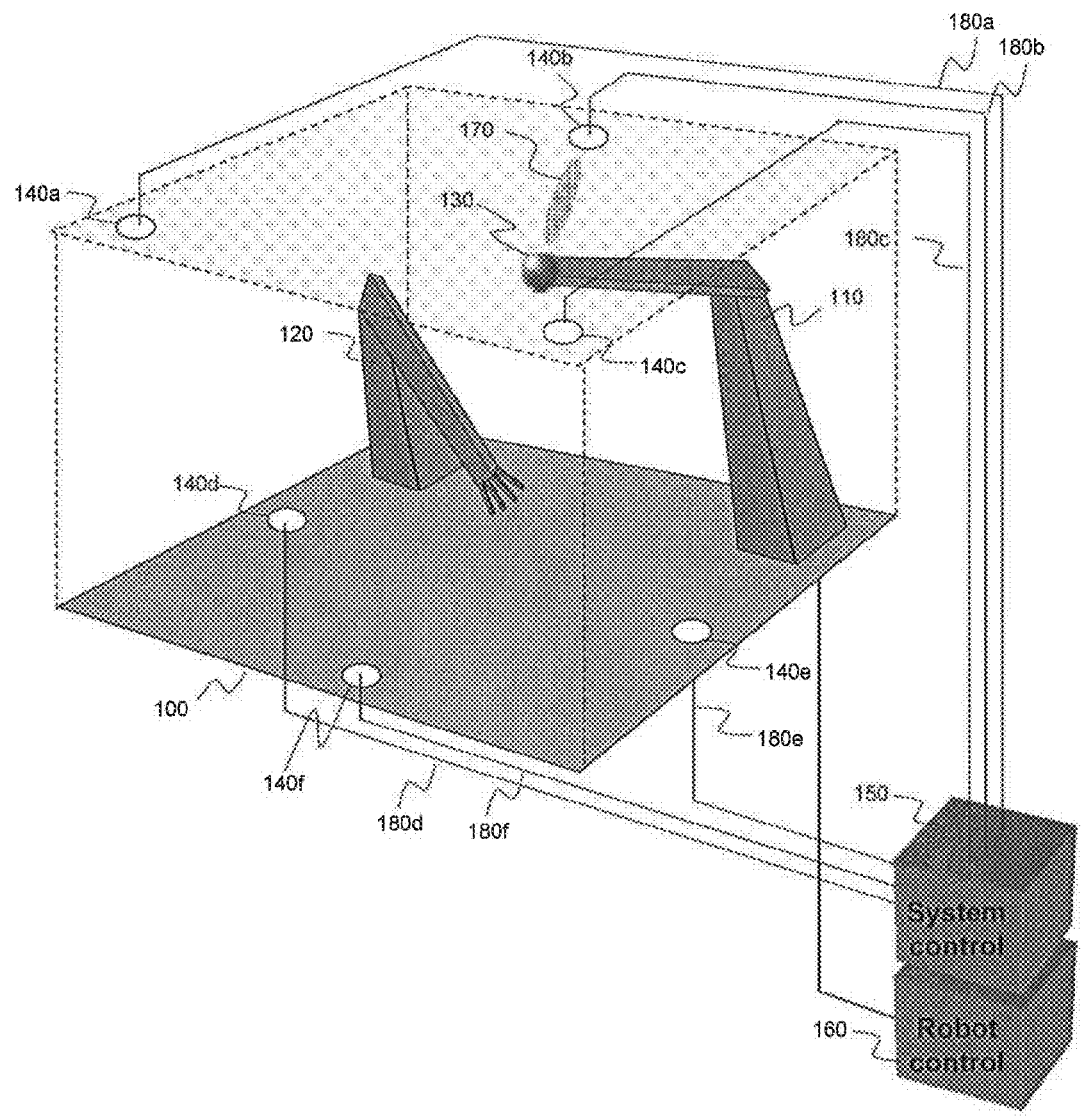
FIG. 6 depicts an example application with a movable image source wirelessly connected to fixed second nodes.

FIG. 6 is an example of a communication system 100 where a movable (first node) image source is connected to a plurality of fixed second nodes through wireless communication links, e.g. of the radio type. Each second node is connected to a separate and remote system control through a wired link. It illustrates also an example of a wireless communications network in which it is possible to implement the methods for determining the best paths, and for optimizing the bandwidth usage according to a particular embodiment compliant with the invention.

The system 100 comprises an industrial robot having an arm 110 and one or more arms 120. The arm 110 is equipped on its end with at least one image capture device (video camera or still image camera). In order to allow the wireless transmission of the captured images, a first communication node 130 is connected to or integral with the image capture device. The image capture device and first node 130 are therefore free to move in order for the image capture device to locate to a desired position or orientation for observation. In a particularly useful embodiment the capture device may be optionally selected and picked up by a robot arm, moved and used to capture images from a variety of positions and orientations, and then returned, for example to a docking station. Wireless communication as herein described allows real time transmission of still or moving images throughout the operation.

In order to communicate with the first node 130, a plurality of second nodes 140a, 140b, 140c, 140d, 140e, 140f are arranged at fixed locations within the robot working space 100. All the second nodes are located within the first node wireless coverage area. In the present embodiment six second nodes are used, but a different number of second nodes may be envisaged. A satisfactory number may be a compromise between economical aspects and the efficiency against shadowing.

Thanks to multiple second nodes the quality of the transmission may be enhanced: the overall error rate is lower when the transmission can be performed with spatial diversity (meaning that data is simultaneously transmitted to several destination nodes through different physical paths) for the same data than through a single path.

All the second nodes are connected to a system control 150 through the links 180a, 180b, 180c, 180d, 180e, 180f respectively. In a preferred embodiment, a modem is included in each second node and the interconnection between the second nodes and the system control is performed thanks to digital high speed interfaces using LVDS signals, these high speed wired interfaces are point to point organized, or could be bus oriented; they could be 1000 BaseT or compliant to any other standard, or can be proprietary and use any physical medium allowing high data rate: twisted pairs, optical fiber, coaxial cable, or wireless. Other embodiments could be envisaged where the interconnection physical medium is analogue and modems are not included in the second nodes, but in the system control. This list of interconnection possibilities is not exhaustive.

As an objective is to transport wirelessly high definition images, 60 GHz millimeter waves are used for this high bandwidth transmission. As noted above however, 60 GHz has Line Of Sight propagation characteristics: obstacles can interfere with the RF beams 170 between the emitter and the receiver. The arm 120 is for object manipulations, it is not directly involved in wireless communications, nevertheless according to its position it could be in the Line Of Sight of some paths between the first node 130 and one or more second nodes 140, and so this arm 120 could disturb the wireless communication between the first node 130 and the second nodes 140a, 140b, 140c, 140d, 140e, 140f.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of communicating between a first node and a plurality of second nodes in a network, the method comprising:
   in a first uplink mode, transmitting a first message from all of the plurality of second nodes in sequence, across a corresponding plurality of communication paths, over a first transmission period;
   receiving at one or more of said second nodes, during a first reception period, a first acknowledgement message from said first node in response to said first message, said first acknowledgement message including communication path evaluation information; and
   in a second uplink mode, transmitting a second message from a subset of the plurality of second nodes, said subset selected on the basis of the received path evaluation information, over a second transmission period.

2. A method according to claim 1, wherein transmissions from each of the plurality of second nodes in the first uplink mode include timing data for controlling the time at which said first acknowledgement message is sent, which timing data varies according to the order of transmission in the sequence.

3. A method according to claim 2 wherein said timing data is indicative of the number of transmissions remaining in the sequence.

4. A method according to claim 1, further comprising receiving at one or more of said second nodes, during a second reception period, a second acknowledgement message from said first node in response to said second message.

5. A method according to claim 4, further comprising sending subsequent messages in said second uplink mode.

6. A method according to claim 1, further comprising returning to said first uplink mode following a change in local spatial configuration of the network.

7. A method according to claim 1, further comprising returning to said first uplink mode at predetermined intervals.

8. A method according to claim 1, further comprising returning to said first uplink mode following detected degradation of the communication path from said selected subset of first nodes.

9. A method according to claim 1, wherein said path evaluation information includes reception status.

10. A method according to claim 1, wherein said subset of the plurality of second nodes comprises a single second node.

11. A method according to claim 1, wherein said second transmission period is shorter than first.

12. A method of communicating between a first node and a plurality of second nodes in a network, the method comprising:
   in a first uplink mode, receiving at said first node at least one of a sequence of transmissions of a first message sent from each of the plurality of second nodes, over a corresponding plurality of communication paths, said transmissions including timing data indicative of the number of transmissions remaining in the sequence;
   determining, based on received timing data, a time period for the first node to remain in a reception state; and
   at the end of said time period, transmitting from said first node an acknowledgment message.

13. A method according to claim 12, further comprising deriving communication path evaluation information based on received transmissions of said sequence, and wherein said path evaluation information is included in said acknowledgement message.

14. A method according to claim 13, wherein said path evaluation information includes reception status.

15. A method according to claim 13, wherein said path evaluation information includes a measure of path quality.

16. A wireless communication apparatus adapted to operate in first and second uplink modes, said apparatus comprising:
- a control element that operates, and/or at least one transmit module or element that operates, in a first mode, to transmit a first message sequentially from each of a plurality of spatially separated communication nodes offering a corresponding plurality of communication paths;
- at least one receive module or element that operates, to receive, at one or more of said nodes, a first acknowledgement message in response to said first message, said first acknowledgement message including communication path evaluation information; and
- at least one transmit module or element that operates, in a second mode, to transmit a second message from a subset of the plurality of nodes, said subset selected on the basis of the received path evaluation information.

17. The apparatus according to claim 16, wherein at least one of: (i) the apparatus further comprises at least one insert module or element that operates to insert timing data in the first message transmitted from each of the plurality of nodes in the first uplink mode, said timing data indicating the number of remaining nodes in the sequence; and (ii) the control element further operates to insert timing data in the first message transmitted from each of the plurality of nodes in the first uplink mode, said timing data indicating the number of remaining nodes in the sequence.

18. A wireless communication apparatus comprising:
- means for receiving at least one of a sequence of transmissions of a first message sent over a corresponding plurality of different communication paths, said transmission including timing data indicative of the number of transmissions remaining in the sequence;
- means for determining, based on received timing data, a first time period for remaining in a reception state; and
- means for transmitting, at the end of said first time period, an acknowledgment message.

19. An apparatus according to claim 18, further comprising means for deriving communication path evaluation information based on received transmissions of said sequence, and means for including said path evaluation information in said acknowledgement message.

20. A wireless communication system comprising:
- a control element that operates, and/or at least one transmit module or element that operates, in a first mode, to transmit a first message sequentially from each of a plurality of spatially separated second communication nodes offering a corresponding plurality of communication paths;
- at least one insert module or element that operates to insert timing data in the first message transmitted from each of the plurality of nodes in the first uplink mode, said timing data indicating the number of remaining nodes in the sequence;
- at least one receive module or element that operates to receive at a first node at least one of a sequence of transmissions of the first message sent over said plurality of communication paths;
- at least one module or element that operates to determine at said first node, based on received timing data, a first time period for remaining in a reception state;
- at least one element that operates to derive communication path evaluation information based on received transmissions of said sequence, and at least one element that operates to include said path evaluation information in an acknowledgement message;
- at least one transmit module or element that operates to transmit from said first node, at the end of said first time period, said acknowledgment message;
- at least one receive module or element that operates to receive, at one or more of said second nodes, said acknowledgement message; and
- at least one transmit module or element that operates, in a second mode, to transmit a second message from a subset of the plurality of nodes, said subset selected on the basis of the received path evaluation information.

* * * * *